UNITED STATES PATENT OFFICE 3,629,442
Patented Dec. 21, 1971

3,629,442
SULPHONAMIDES FOR TREATING
HYPERTENSION
Harald Horstmann, Wuppertal-Vohwinkel, and Hartmund Wollweber and Karl Meng, Wuppertal-Elberfeld, Germany, assignors to Farbenfabriken Bayer Aktiengesellschaft, Leverkusen, Germany
No Drawing. Original application June 6, 1967, Ser. No. 643,822, now Patent No. 3,499,005, dated Mar. 3, 1970. Divided and this application May 29, 1969, Ser. No. 829,123
Claims priority, application Germany, June 16, 1966,
F 49,487
Int. Cl. A61k 27/00
U.S. Cl. 424—279    10 Claims

ABSTRACT OF THE DISCLOSURE

Pharmaceutical compositions are produced which comprise a compound of the formula:

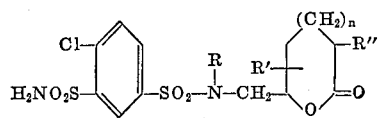
(III)

or

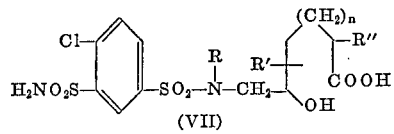
(VII)

wherein:

R is hydrogen or methyl;
R′ is hydrogen or lower alkyl.
R″ is hydrogen or lower alkyl; and
$n$ is 0 or 1;

or a pharmaceutically acceptable non-toxic salt thereof, in combination with a pharmaceutically acceptable inert diluent or carrier. These compositions are useful for their saluretic effect and are useful in treating edema and hypertension.

---

This is a divisional of our copending application Ser. No. 643,822 filed June 6, 1967, now Pat. No. 3,499,005.
The present invention is concerned with disulphonamides of the formula;

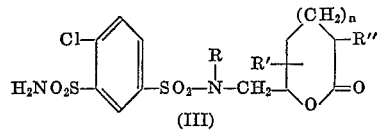
(III)

wherein R is hydrogen or methyl, R′ is hydrogen or lower alkyl, R″ is hydrogen or lower alkyl and $n$ is 0 or 1, and their pharmaceutically acceptable non-toxic salts. These compounds have been found to be useful saluretics and have been found to possess a much greater diuretic-saluretic effect than known compounds and a much more advantageous $Na^+/K^+$ quotient. 2,4-disulphamyl-chlorobenzenes of the formula:

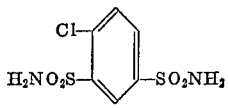

are known to have salt-eliminating effects [cf. Jakob. Dtsch. Med. Wschr. 85, 814 (1960)]. It is also known in the art that certain derivatives of 2.4-disulphamyl chlorobenzene, in which the sulphamyl radical in the p-position to the chlorine atom is mono- or disubstituted, are superior to the unsubstituted compound in salt-eliminating or saluretic effects (cf. Belgian Patent No. 598,722; German Patent Nos. 1,096,897 and 1,111,618).

On comparison with the effectiveness of commercial diuretics of the sulphonamide series, such as hydrochloro thiazide [U.S. Patent No. 2,809,194; Experimentia 14, 458 (1958)], the effect of the benzene m-disulphonamides referred to above must be regarded as poor, and. according to the present state of the art, have only limited clinical interest in applicability.

All of the above compounds have in common the fact that besides the desired elimination of $Na^{(+)}$ and $Cl^{(-)}$ ions, $K^+$ ions are simultaneously eliminated to a greater or lesser degree. This results in a very serious contra-indication particularly in cases of prolonged therapeutic or clinical application, namely hypopotassemia. It is therefore particularly important for any saluretic which is intended to be administered over any substantial period of time that the $Na^+/K^+$ quotient should be as high as possible.

It has now been found that disulphonamides of the formula:

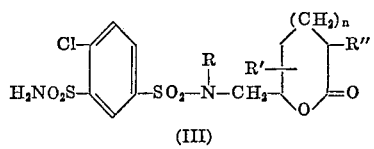
(III)

wherein R is hydrogen or methyl, R′ is hydrogen or lower alkyl, R″ is hydrogen or lower alkyl and $n$ is 0 or 1, have a much greater diuretic-saluretic effect and a much more advantageous $Na^+/K^+$ quotient than presently known diuretic-saluretic compounds. The disulphonamides (III) may be obtained by
(a) reacting 4-chloro 3-sulphonamido-benzene sulphochloride of the formula:

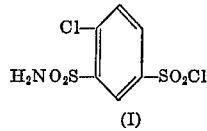
(I)

with amines and/or their salts of the formula:

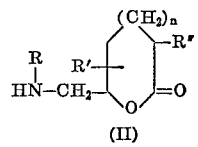
(II)

either in the presence or absence of acid-binding agents;
(b) by reacting 4 chloro-3-sulphonamido-benzene sulphochloride of the formula:

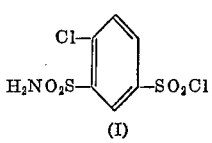
(I)

with an aminoalkyl-hydroxy-carboxylic acid, aminoalkyl-hydroxy-carboxylic acid ester or salt of the formula:

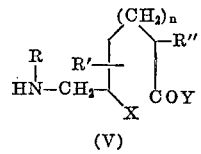
(V)

closing the lactone ring by subsequent heating with hydrolysing agents, if desired after acidification and heating;

(c) treating 4-chloro-3-sulphonamido-benzene sulphonamides of the formula:

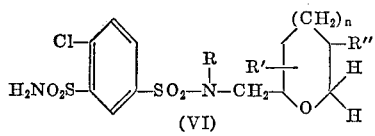

(VI)

with oxidizing agents; or (d) converting the salts of hydroxycarboxylic acids of the formula:

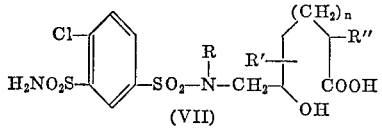

(VII)

in an alkaline medium into the cyclic form (III) by acidification, such as with hydrochloric acid, and, if desired, by heating, wherein R is hydrogen or methyl, R' is hydrogen or lower alkyl, R'' is hydrogen or lower alkyl, X is an OH group or its reactive esters, such as the tosyloxy group or halogen, Y is an OH group, O-lower alkyl or OMe group wherein Me is an alkali metal or alkaline earth metal and $n$ is 0 or 1.

According to process (a), the amines of the Formula II are preferably used in the form of their salts, such as the hydrochlorides or acetates and are liberated in the presence of sulphochloride (I) by acid-binding agents. The aminoalkyl-lactones of the Formula II can also be replaced with the aminoalkylhydroxy acids (IV) from which they are derived and which may be in equilibrium in aqueous media according to the following:

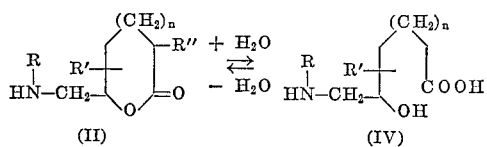

(II)            (IV)

It is also possible to replace the aminoalkyl-hydroxycarboxylic acids (IV) with their functional derivatives of the Formula V, according to process (b), such as their hydroxy esters, carboxylic acid salts or carboxylic acid esters. As described in process (b), the lactone ring can be closed after the reaction of compounds (V) and (I) by subsequent treatment with hydrolyzing agents, if desired after acidification and heating:

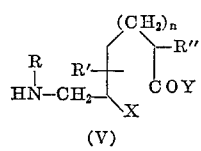

(V)

The disulphonamides (III) of the present application may be present in the form of racemates or in the form of their dextro-rotatory or levo-rotatory optically active isomers. Examples 2 and 3 illustrate the production of levo-rotatory and dextro-rotatory disulphonamides according to process (c).

The oxidizing agents with which compounds (VI) are treated include, inter alia, potassium permanganate, chromic acid, nitric acid, ruthenium dioxide, manganese dioxide, oxygen or air, at an elevated temperature and increased pressure in the presence of known catalysts.

The disulphonamides of the Formula III obtained according to the processes disclosed herein may be present in equilibrium with hydroxycarboxylic acid (VII) from which they are derived:

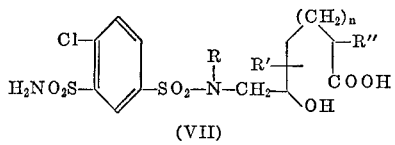

(VII)

In an alkaline medium, the salts of hydroxycarboxylic acids (VII) may be present to a considerable extent. These compounds are converted into the cyclic form of the disulphonamides (III) by acidification, such as with hydrochloric acid, and, if desired, by heating.

With non-toxic bases, disulphonamides (III) form salts which are derived either from (III) or (V) depending upon whether one or two equivalents of a corresponding base have been used.

On comparison with known diuretics and saluretics, the compounds of the present invention not only exhibit a higher activity and a substantially improved $Na^+/K^+$ quotient, but they are also suitable for parenteral administration to humans and animals by virtue of the fact that, in contrast to many diuretics-saluretics, they are soluble in the form of their monosalts at an almost neutral pH. No stabilizers are required for the preparation of the aqueous solution to be used for parenteral administration.

The products according to the present invention are also useful for sweeping out edema of various genuses as well as for the treatment of hypertension. In the treatment of edema, preparations containing the disulphonamides of the present invention are administered in a dosage in the range of from 20 to 100 mg. per day. When used in the treatment of hypertension, which normally requires treatment for a prolonged period of time, a dosage in the range of 10 to 30 mg. per day is used.

The compounds of the present invention may be mixed with pharmaceutically inert carriers, such as talc, lactose, starch, ethylcellulose, agarpectin, stearic acid, magnesium stearate, sodiumbicarbonate or gelatin.

For parenteral application salts with non-toxic bases of the open ring hydroxycarboxylic acid are used. These salts enable the preparation of stable aqueous solutions at a substantially neutral pH.

The above-mentioned solid and liquid preparations can be formed into capsules, tablets, pills, powder, granulates, suppositories, ampules or drops.

The following non-limitative examples illustrate the production of typical compounds and administration forms of the present invention:

EXAMPLE 1

190 grams (0.5 mole) chlorobenzene-2,4-disulphonic acid amide-(2)-[α-(α-methyl) - tetrahydrofurfuryl] - N-methylamide-(4) are dissolved in a solution of 40 g. NaOH (1 mole) in 1 litre of water. 126 grams potassium permanganate are added, the mixture is stirred at 50° C. for 10 hours, filtered off from pyrolusite, the filtrate is buffered with an ammonium chloride solution and the starting material filtered off. After subsequent acidification with dilute hydrochloric acid, chlorobenzene-2,4-disulphonic acid amide - (2) - [α - (α - methyl-α'-oxo)-tetrahydrofurfuryl]-N-methylamide-(4) is precipitated and crystallizes completely in the course of several hours. M.P. 153 to 156° C. (alcohol), yield 118 g. A further 15 g. of crude lactone can be isolated from the mother liquor. The total yield, referred to the reacted starting material, amounts to 81%.

EXAMPLE 2

Levo-rotatory chlorobenzene - 2,4 - disulphonic acid amide - (2) - [α - (α - methyl-α' - oxo)-tetrahydrofurfuryl]-N-methylamide-(4):

According to the method described in Example 1, 19 g. levo-rotatory chlorobenzene - 2,4 - disulphonic acid-(2)-

[α - (α - methyl) - tetrahydrofurfuryl]-N-methylamide-(4) M.P. 145 to 146° C., $[\alpha]^{20}_{365} -17.1°$ (2.0% in menthanol)

are dissolved in 100 ml. of water and 4 g. sodium hydroxide and oxidized with 12.5 g. potassium permanganate. Yield 87% of theory, M.P. 168 to 170° C., $[\alpha]^{20}_{578} -5.0°$; $[\alpha]^{20}_{546} -5.5°$; $[\alpha]^{20}_{436} -10.7°$; $[\alpha]^{20}_{450} -13.7°$;

$[\alpha]^{20}_{365} -19.95°$;

The starting material is obtained in the following manner:

(dl) - methyl - α - aminomethyl-tetrahydrofuran is resolved with (d)(−)-tartaric acid into dextro-rotatory α-methyl-α-aminomethyl-tetrahydrofuran, B.P. 74 to 78° C./50 mm. Hg, $[\alpha]^{20}_{365} +6.65°$ (2.6% in chloform)

hydrochloride M.P. 196° C., $[\alpha]^{20}_{578} -11.33°$ (1.5% in methanol)

and this is reacted with 4-chloro-3-sulphonamido-benzene sulphochloride to give the levo-rotatory chlorobenzene-2,4 - disulphonic acid amide-(2)-[α-(α-methyl)-tetrahydrofurfuryl]-N-methylamide-(4).

EXAMPLE 3

Dextro-rotatory chlorobenzene - 2,4 - disulphonic acid amide - (2) - [α - (α - methyl - α' - oxo)-tetrahydrofurfuryl] - N - methylamide-(4):

The product which is obtained in analogy with Example 2 in a yield of 82% by oxidation of 19 g. of dextro-rotatory chlorobenzene-2,4-disulphonic acid amide-(2)-[α - (α - methyl)-tetrahydrofurfuryl]-N-methylamide-(4) with 12.5 g. potassium permanganate in 100 ml. of water and 4 g. NaOH, has the following constants:
M.P. 168 to 170° C., rotation values, measured in methanol $c_1$ 2.012:

$[\alpha]^{20}_{578} +5.0°$; $[\alpha]^{20}_{546} +5.7°$; $[\alpha]^{20}_{436} +10.7°$; $[\alpha]^{20}_{405} +13.7°$;

$[\alpha]^{20}_{365} +19.90°$

Starting material: levo-rotatory α-methyl-α-methyl-aminomethyl-tetrahydrofuran, B.P. 70 to 74° C./45 mm. Hg, $[\alpha]^{20}_{365} -6.75°$ (1.6% in chloroform)

hydrochloride M.P. 196° C., $[\alpha]^{20}_{578} +10.9°$ (2.06% in methanol)

dextro-rotatory chlorobenzene-2,4-disulphonic acid amide-(2) - [α - (α - methyl)-tetrahydrofurfuryl]-N-methylamide-(4), M.P. 145 to 146° C., $[\alpha]^{20}_{365} +17.55°$ (2.02% in methanol)

EXAMPLE 4

To a solution of γ-hydroxy-γ-aminomethyl-valerianic acid ethyl ester acetate, which was obtained by hydrogenating 34.2 g. γ-hydroxy-γ-cyano-valerianic acid ester in glacial acetic acid with a Pt-catalyst, in 40 ml. acetone and 40 ml. of water there is simultaneously added dropwise at 20° C. with vigorous centrifuging a solution of 42.75 g. 4-chloro-3-sulphonamide-benzene sulphochloride in 100 ml. acetone and a solution of 31.5 g. sodium carbonate in 50 ml. of water. The mixture is stirred overnight, filtered off from inorganic components, concentrated by evaporation in a vacuum, the residue is taken up with water/dilute hydrochloric acid and the organic components are extracted with a mixture of ether/ethyl acetate. After evaporation of the organic phase there remain 10 g. of an oil which completely crystallizes after brief heating with dilute hydrochloric acid to give chlorobenzene-2,4-disulphonic acid amide-(2)-[α-(α-methyl-α'-oxo) - tetrahydrofurfuryl]-amide-(4), M.P. 188 to 189.5° C. (alcohol/water).

EXAMPLE 5

According to the method described in Example 4 it is also possible to start from α-aminomethyl-α-methyl-butyrolactone acetate which is obtained by catalytic hydrogenation of α-cyano-α-methyl-butyrolactone in glacial acetic acid by means of a Pt-catalyst, and to react this with 4 - chloro - 3 - sulphonamido-benzene sulphochloride in acetone in the presence of a sodium carbonate solution. After appropriate working up there is obtained chlorobenzene - 2,4 - disulphonic acid amide-(2)-[α-(α-methyl - α' - oxo)-tetrahydrofurfuryl]-amide-(4), M.P. 188 to 189.5° C.

EXAMPLE 6

A solution of γ-hydroxy-γ-methylaminomethyl-valerianic acid-lactone hydrochloride is reacted according to the method described in Example 2, with 4-chloro-3-sulphonamido-benzene sulphochloride in acetone in the presence of water. After appropriate working up, there is obtained chlorobenzene-2,4-disulphonic acid amide-(2)-[α-(α - methyl-α'-oxo)-tetrahydrofurfuryl]-N-methylamide-(4) of M.P. 153 to 156° C. in a yield of 22%.

The γ - hydroxy - γ - methylaminomethyl-valerianic acid-lactone hydrochloride is obtained in the following manner:

²/₁₀ mole γ-hydroxy-γ-cyano-valerianic acid methyl ester are hydrogenated in glacial acetic acid with a Pt-catalyst. The mixture is evaporated in a vacuum, the residue dissolved in a little alcohol, 26.5 g. benzaldehyde are added and then 6.5 g. NaOH dissolved in 100 ml. of alcohol are slowly added dropwise at 20° C. After the addition of benzene, the mixture is stirred at 50° C. for 10 minutes, evaporated in a vacuum, taken up with 200 ml. of benzene and, after the addition of 22 g. dimethyl sulphate, heated at 90° C. for a good 20 minutes. The reaction product is decomposed with dilute hydrochloric acid, the precipitated benzaldehyde is extracted with ether and after evaporation there is obtained crude γ-hydroxy-γ-methylamino-methyl-valerianic acid-lactone hydrochloride which is reacted, without previous purification, with 42 g. 4-chloro-3-sulphonamido-benzene sulphochloride.

EXAMPLE 7

In analogy with Example 1, there were obtained:
Chlorobenzene-2-,4-disulphonic acid amide-(2)-[α-(α'-oxotetrahydrofurfuryl] - N - methylamide - (4) of the formula:

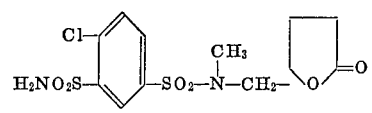

M.P. 138–140° C., yield 38% of theory;
Chlorobenzene - 2,4 - disulphonic acid amide - (2)-[α-(α,β' - dimethyl - α' - oxo)-methyl-tetrahydropyranyl]-N-methylamide-(4) of the formula:

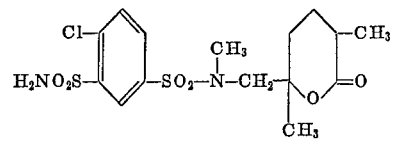

M.P. 142–145° C., yield 38% of theory.

EXAMPLE 8

50 g. of chlorobenzene-2,4-disulphonic acid amide-(2-[α(α - methyl - α' - oxo)-tetrahydrofurfuryl]-N-methylamide-(4), 7 g. of sodiumbicarbonate and 2.5 g. of magnesium stearate are ground and filled with gelatin capsules each containing 0.05 g.

EXAMPLE 9

396.5 g. of chlorobenzene-2,4-disulphonic acid amide-(2) - [α - (α - methyl - α'-oxo)-tetrahydrofurfuryl]-N-methylamide-(4) is dissolved in 2000 ml. of 1 n NaOH solution. The solution is heated for one hour to 100° C., cooled and the pH is adjusted to 7.2 by the addition of 1 $n$ HCl (about 950 ml. 1 $n$ HCl) and filled up to 10 litres by adding distilled water. The solution is sterilized and filled into ampules of 1 or 2 ml.

What is claimed is:

1. A pharmaceutical composition which comprises a therapeutically effective amount for treating hypertension of a compound of the formula:

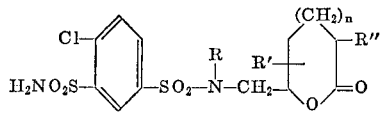

wherein:

R is hydrogen or methyl;
R' is hydrogen or lower alkyl;
R'' is hydrogen or lower alkyl; and
$n$ is 0 or 1;

or a pharmaceutically acceptable non-toxic salt thereof, in combination with a pharmaceutically acceptable inert diluent or carrier.

2. A composition according to claim 1 wherein the compound is chlorobenzene-2,4-disulphonic acid amide-(2) - [α - (α - methyl - α'-oxo)-tetrahydrofurfuryl]-N-methylamide-(4).

3. A composition according to claim 1 wherein the compound is levo-rotatory chlorobenzene-2,4-disulphonic acid amide - (2) - [α(α - methyl-α'-oxo)-tetrahydrofurfuryl]-N-methylamide-(4).

4. A composition according to claim 1 wherein the compound is dextro-rotatory chlorobenzene-2,4-disulphonic acid amide-(2)-[α(α-methyl-α'-oxo)-tetrahydrofurfuryl]-N-methylamide-(4).

5. A composition according to claim 1 wherein the compound is chlorobenzene-2,4-disulphonic acid amide-(2)-[α-(α'-oxo)-tetrahydrofurfuryl]-N-methylamide-(4).

6. A composition according to claim 1 wherein the compound is chlorobenzene-2,4-disulphonic acid amide-(2) - [α - (α,β' - dimethyl-α'-oxo)-methyl-tetrahydropyranyl]-N-methylamide-(4).

7. A composition according to claim 1 wherein the compound is chlorobenzene-2,4-disulphonic acid amide-(2)-[α-(α-methyl-α'-oxo)-tetrahydrofurfuryl]-amide-(4).

8. A composition according to claim 1 wherein the compound is:

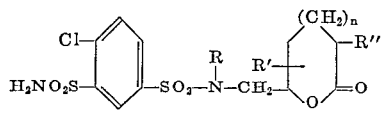

wherein:

R is hydrogen or methyl;
R' is hydrogen or lower alkyl;
R'' is hydrogen or lower alkyl; and
$n$ is 0 or 1;

or a pharmaceutically acceptable non-toxic salt thereof, and the composition is in a form suitable for oral administration.

9. A method of treating hypertension in humans and animals which comprises administering an antihypertensive effective amount of a compound of the formula:

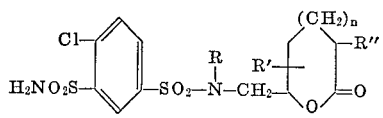

wherein:

R is hydrogen or methyl;
R' is hydrogen or lower alkyl;
R'' is hydrogen or lower alkyl; and
$n$ is 0 or 1;

or a pharmaceutically acceptable non-toxic salt thereof, until alleviation of the condition occurs.

10. A method of treating hypertension according to claim 9 wherein the therapeutically effective amount is from 10 mg. to 30 mg. per day.

References Cited

Wagner and Zook, Synthetic Organic Chemistry, 1953, pp. 822–23 and p. 533.

JEROME D. GOLDBERG, Primary Examiner

U.S. Cl. X.R.

424—319